March 5, 1963  H. A. THEILEMANN  3,079,837
PROTECTIVE COATINGS FOR PHOTOGRAPHIC FILMS
Filed March 15, 1960
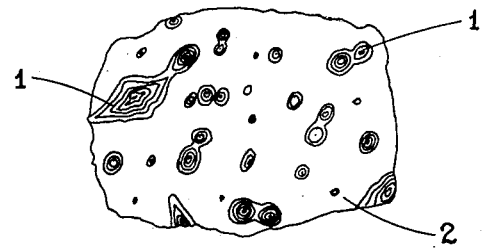
INVENTOR.
HORST A. THEILEMANN
BY
Connolly and Hutz
his ATTORNEYS 3,079,837
PROTECTIVE COATINGS FOR PHOTOGRAPHIC FILMS
Horst A. Theilemann, Munich, Germany, assignor to Agfa Aktiengesellschaft, Leverkusen, Germany, a corporation of Germany
Filed Mar. 15, 1960, Ser. No. 15,106
Claims priority, application Germany Mar. 18, 1959
3 Claims. (Cl. 88—19.5)

The present invention relates to protective coatings, especially coatings for photographic films, which are distinguished by a high resistance to scratching, and substantial resistance to finger prints and atmospheric moisture, while preventing at the same time the interference phenomenon known as Newton rings when placed in contact with smooth flat surfaces.

A number of processes have been devised to protect photographic films, in particular developed photographic films, against premature wear and tear or scratching. These processes comprise for example hardening the photographic silver halide emulsion layers, coating the films on both sides with clear lacquers, matting the backside of films by swelling and pressing the film carrier so as to adhere to a suitable matte support as well as the treatment of the film surfaces with so-called lubricants, for instance, waxes or silicone oils. By adopting the aforesaid processes, however, it has hitherto not been possible to increase the scratching resistance of films to an appreciable extent.

Photographic films show the further disadvantage of being susceptible to producing the interference phenomenon known as Newton rings when placed in contact with smooth surfaces. This can happen, for instance, in the projection of cinefilms in projection apparatus, in printing films in enlargers or in framing miniature films between glass plates to produce a slide for projection, and in the subsequent projection of such slides in projection apparatus. To eliminate this disadvantage it has been known to use etched glass plates having rough surfaces for framing miniature films, and to project cinefilms and miniature films with intense cooling or to avoid keeping the films in the projector for a long period of time. It has further been proposed to produce coatings on photographic films by using matte lacquers. The matte lacquers used for this purpose consist of solutions of organic film-forming substances containing granular matting agents in a dispersed form. These matting agents may consist of either of inorganic pigments, for instance titanium dioxide or barium sulfate, or of organic substances which are dispersed in the lacquers in form of solid, crystalline or crystal-like powders. The coatings produced by using these matte lacquers show the disadvantage that considerable losses in light and brilliancy occur during projection, since deflection and refraction of light takes place on the surfaces roughened by the granular matting agents. The same disadvantage is obtained when framing miniature films by using glass plates having a rough surface.

In accordance with the present invention it has been found that the aforesaid disadvantages can be overcome by using in the production of protective coatings, especially coatings for photographic films, solutions of organic film-forming substances in organic solvents having heterogeneously dispersed therein an organic film-forming substance in the form of a gel, or in the form of a solution in an organic solvent.

The accompanying drawing shows a top plan view of the irregularly shaped particles dispersed in the protective coating.

Suitable film-forming substances for the production of the coatings according to the invention are organic film-forming substances which are soluble in organic solvents. As examples there may be mentioned cellulose esters, such as cellulose acetate, cellulose acetobutyrate, cellulose acetopropionate, nitrocellulose, cellulose ethers, such as ethyl cellulose, benzyl cellulose, linear polyesters, for instance polycarbonates, especially polyesters of carbonic acid and aromatic dihydroxy compounds, for instance, the polycarbonate of bisphenol A which is also known as 4,4'-dihydroxydiphenyldimethylmethane, which polycarbonates contain structural units of the formula:

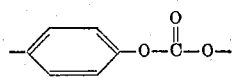

polyamides, polyacrylates and polymethacrylates, copolymers of acrylic and methacrylic esters with each other or with other monoethylenically unsaturated monomers, polyvinyl chloride, copolymers of vinyl chloride with other monoethylenically unsaturated monomers, such as vinylidene chloride, vinyl acetate, vinyl lower alkyl ethers, acrylonitrile, acrylic acid, methacrylic acid, maleic acid and esters or semi-esters of said acids, whereby the monomers containing carboxyl groups are applied in amounts of 1–20%, preferably 1–10% by weight as calculated on the weight of the total monomers; copolymers have proved to be especially suitable, polymers of monovinyl-aromatic compounds, for instance styrene, and copolymers of monovinyl-aromatic compounds with other monomers, as for instance butadiene, vinyl alkyl ethers, acrylic and methacrylic acid, maleic acid and their esters, acrylonitrile; alkyd resins, for instance glycerin-phthalic acid-maleic acid condensation products, pentaerythrite-colophony-maleic acid condensation products, polyvinyl acetate, polyvinyl propionate, copolymers of said organic vinyl esters with other monomers, for instance acrylates and methacrylates, heat-hardenable melamine-formaldehyde resins, polyethylene. As to the alcohol components of the aforementioned esters, saturated aliphatic and cycloaliphatic monohydric alcohols having 1–20 carbon atoms may be used. In case that ethylenically unsaturated carboxylic acids are used as components of the copolymer, these acids are preferably applied in amounts not surpassing 10% by weight of the total monomers used for the production of the copolymers. The aforesaid film-forcing substances generally yield solid, non-tacky coatings.

In the preparation of the lacquer solutions, the film-forming substances are dissolved in suitable organic solvents. Another organic solvent which is capable of precipitating a portion or all of one of the film-forming substances that is present in the solution is then added to the solution. When the solution contains only one film-forming substance, the precipitating organic solvent and its amount must be controlled so as not to precipitate all of the substance from the solution as a solid. In other cases, the precipitating solvent may be one which will precipitate all or only a portion of one of the film-forming substances in the form of gel-like particles from a solution containing two or more different film-forming substances. Precipitation of the film-forming substance as a solid is to be avoided; and the precipitation should proceed in such manner that the film-forming substances is precipitated in the form of gel-like particles which retain a portion of the solvent. Thus the solution contains a film-forming substance or part of a film-forming substance in molecular-dissolved form and another film-forming substance or part of a film-forming substance in the form of a gel which may deposit upon storing the solution. Although it is possible in principle to produce suitable coating solutions by using only one film-forming substance, optimum results are obtained with solutions which have been prepared by using at least two different film-forming substances with different solubility properties. It is preferred to adjust the ratios of the film-forming substance present in gel form and of the molecular-dissolved film-forming substance such that former is present in smaller amounts than the latter.

The choice of the solvents and the relative quantity thereof depends on the solubility properties of the film-forming substances used. Suitable solvents for the purpose of the invention are, for instance, chlorinated hydrocarbons, for instance ethylene chloride, trichloroethane, methylene chloride, chloroform, carbon tetrachloride, aromatic hydrocarbons, as for instance benzene, toluene, as well as aliphatic hydrocarbons, such as benzines, and ketones, as for instance acetone. In order to ensure uniform drying, it is advisable to add to the solutions solvents having a relatively high boiling point, for instance xylene, methyl glycol acetate, ethyl acetate and ethyl glycol ether. Besides, it has proved to be advantageous in many cases to add to the solutions small amounts of organic acids, for instance acetic acid, which bring about an improved adhesion of the coatings to the photographic layers. Moreover, surface lubricants, in particular silicone oils (polydimethyl siloxane oils, methyl phenyl polysiloxane oils), may be added to the solutions.

The invention is further illustrated by the following examples without being restricted thereto.

*Example 1*

50 g. of cellulose acetobutyrate such as "Cellit B 900" a trade name of Farbenfabriken Bayer AG
20 g. of the polycarbonate of bisphenol A are dissolved in:

300 cc. of methylene chloride
500 cc. of trichloroethylene
200 cc. of toluene.

The toluene acts as a non-solvent for the polycarbonate, while the cellulose acetobutyrate is dissolved in all the three solvents in molecular form. Part of the polycarbonate is precipitated in this mixture in the form of a gel.

*Example 2*

50 g. of cellulose acetobutyrate
10 g. of the polycarbonate of bisphenal A
10 g. of the styrene copolymer containing carboxyl groups (EMU-Pulver 120 F 1, a trade name of Badische Anilin- & Soda-Fabrik AG)

are dissolved in:

550 cc. of trichloroethylene
100 cc. of acetone
300 cc. of methylene chloride
50 cc. of carbon tetrachloride Carbon tetrachloride acts as a non-solvent for the styrene copolymer.

Depending on the choice of the cellulose ester, partial non-dissolution may occur due to the carbon tetrachloride so that a gel-like flocculation of the two components may take place when using this starting solution. Besides, dissolved polycarbonate and a dissolved cellulose ester are not compatible in the solution so that advantageous flocculation effects are obtained upon drying the lacquer.

*Example 3*

25 g. of polyvinyl chloride
5 g. of the polycarbonate specified in Example 1
70 g. of the cellulose ester specified in Example 1 are dissolved in:

400 cc. of methylene chloride
40 cc. of methanol
260 cc. of trichloroethylene
50 cc. of methylglycol acetate
150 cc. of carbon tetrachloride
100 cc. of toluene.

Trichloroethylene and toluene are non-solvents for polyvinyl chloride. Carbon tetrachloride is the solvent component for cellulose ester.

*Example 4*

20 g. of the styrene copolymer specified in Example 2
10 g. of cellulose acetobutyrate are dissolved in:

700 cc. of trichloroethylene
55 cc. of methylene chloride
5 cc. of methanol
10 cc. of acetone
10 cc. of acetic acid (98–99%)
100 cc. of carbon tetrachloride
60 cc. of toluene
60 cc. of xylene.

The polystyrene component is not soluble in xylene and toluene. This starting solution is preferably applied to the emulsion side of the film carrier where acetic acid brings about a very good adhesion and at the same time some hardening effect. In this lacquer mixture the difficulty volatile non-solvents xylene and toluene cause a relatively slowly proceeding, but particularly uniform gel formation.

The solution can be applied at room temperature. The coatings produced therewith have the advantage that they do not become soft at higher projection temperatures.

*Example 5*

70 g. of the styrene copolymer specified in Example 2
30 g. of ethyl cellulose are dissolved in:

400 cc. of benzene
300 cc. of toluene
200 cc. of acetone
100 cc. of xylene.

Xylene is a non-solvent for the styrene copolymer. Coatings produced from this mixture show the advantage of being especially elastic at higher temperatures and, therefore, they are particularly useful for cinefilms.

*Example 6*

30 g. of a copolymer of vinylchloride (80% by weight), vinylacetate and maleic acid (acid number 25)
10 g. of the polycarbonate specified in Example 1 are dissolved in:

480 cc. of triethylene chloride
200 cc. of methylene chloride
50 cc. of methylglycol acetate
100 cc. of carbon tetrachloride
20 cc. of methanol
100 cc. of acetone
50 cc. of xylene.

In this mixture xylene and methylglycol acetate act as non-solvents. Coatings produced from this mixture are distinguished by an elasticity at projection temperatures which substantially prevents any scratching.

The solution is preferably applied at a temperature of +35° C.

*Example 7*

30 g. of a melamine-formaldehyde resin
70 g. of nitrocellulose are dissolved in:

50 cc. of benzine
300 cc. of ethyl alcohol
200 cc. of methyl alcohol
100 cc. of acetone
50 cc. of butanol
250 cc. of ethylacetate
50 cc. of xylene.

Coatings produced from this mixture are difficult to melt and extremely hard.

*Example 8*

5 to 50 g. of the styrene copolymer specified in Example 2
5 to 100 g. of a cellulose ester, e.g., such as is specified in Example 2, are dissolved in:

10 to 300 cc. of acetone
10 to 300 cc. of methylene chloride
10 to 500 cc. of trichloroethylene
10 to 500 cc. of ethylene chloride
1 to 50 cc. methanol
1 to 30 cc. of acetic acid
1 to 100 cc. of methyl glycol acetate (1,2-diacetoxypropane)
1 to 100 cc. of toluene
1 to 100 cc. of xylene.

The above example illustrates the limits within which the quantities of solvents and film-forming substances can be varied.

In order to prevent the gel substances from being precipitated, the solutions according to the invention are required to be more or less thoroughly mixed during application. Mixing can be effected by hand, but also by using a stirrer or ultrasonics. The lacquer can be applied at a relatively high velocity on the travelling film and in such a manner that the thickness of the coating can be adjusted. Application of the lacquer can be carried out by means of calenders which are equipped with adjustable strippers or by using roller applicators. It is further possible to apply the lacquer by spraying or dipping, which is particularly advantageous in the treatment of large surfaces. Drying is effected at temperatures between about 30 to 80° C., preferably in an air-stream.

Upon drying, a continuous film is produced from the homogeneous phase of the solution, while the dispersed phase yields solids which are distributed at random in the continuous film. The film is thus given by these dispersed particles an undulating non-uniform surface structure which becomes visible in reflected light by a matte appearance. Since, however, the dispersed particles and the continuous film are transparent, practically no losses in light and brilliancy of the coated films occur during projection. In this respect, the protective coatings produced according to the invention are distinguished to advantage from protective coatings prepared with the matting lacquers customarily used. In the customary matting lacquers the crystalline and/or opaque matting agents due to the formation of sharp edged surface structure cause a considerable loss of light and brilliancy during projection.

The particles dispersed in the protective coatings produced according to the invention are in general of irregular shape, as may be seen from the accompanying diagrammatic drawing which is an enlarged top view of a protective coating produced according to the invention. In this drawing the irregularly shaped particles are indicated by the reference numeral 1 while the matrix or binding material of the protective coating or film is represented by numeral 2. The maximum diameter of the particles may vary between about 0.1 and 70 microns. In order to obtain a good anti-Newton-effect it is preferable to choose particles having a maximum diameter between 5 and 25 microns. If the particles have a size between 5 and 25 microns, the irregularity of the surface structure is hardly visible, although the anti-Newton-effect is obtained also in this case.

As may be seen from the foregoing examples, the composition of the lacquer mixtures can be varied depending on the desired properties of the coatings. It is within the scope of the invention to produce high-melting, hard protective coatings, low-melting, soft protective coatings, coatings have a good adhesion strength, coatings of a very good elasticity, as well as coatings of great hardness. The unevenness of the surface can further be influenced by varying the ratio of the components to one another, and by varying the solids contents of the lacquer mixtures to the ratio of the solvents. As described above, the resistance to scratching of the coatings can be increased by adding to the solutions silicone oils in quantities of about 0.001 to 0.1% by weight. The structure of the protective coatings produced according to the invention can further be varied by adopting appropriate methods of applying the lacquer solutions. The dispersed phase becomes finer by more thoroughly stirring the solutions. By varying the thickness of the protective coatings, the extent of the surface unevenness and at the same time the strength of the protective effect can be varied to a certain degree.

The quality of the lacquer used for producing protective coatings according to the invention can be tested by abrasion experiments, by measuring the thickness of the coatings and by storing the lacquer under varying climatic conditions. The starting solution is preferably adjusted with a microscope or an interference microscope while controlling the extent of the surface unevenness obtained therewith. Flms provided with protective coatings according to the invention are substantially less liable to scratching and can be used twice as long as films provided with other protective coatings or non-protective films before the degree of scratching is identical.

Because of the hydrophobic character of the relatively smooth, but uneven surface, finger prints and other interferences with fatty material are harmless to the protective coating produced according to the invention and can be removed by mere wiping. Optical irregularities caused by any damages to the surface of the film to be coated are completely eliminated by applying the protective coatings, according to the invention. Like any other protective coatings, the protective coatings produced according to the invention ensure a very good protective effect against climatic influences, especially moisture and dry air. The increase of the resistance to scratching which is of particular importance for the cinefilm, is caused not only by the film-forming substances used according to the invention, but also by the uneven, wavy, but nevertheless smooth structure of the surface as compared with an even or flat smooth surface. It is already for physical reasons that an uneven and, therefore, larger surface which is nevertheless smooth, has an essentially higher resistance to abrasion and scratching than an even or flat surface.

The herein described solutions are not only suitable in the production of protective coatings on photographic films, but can be used quite generally in the coating of films and foils which are to be subjected to penetration by any light source. They may be used for instance in the preparation of anti glare films or foils for motorcars and other vehicles.

The processed photographic films which are coated with the solutions disclosed herein, generally comprise a transparent film support superimposed upon which are one or more image layers containing silver and/or dyestuff images. The binding agents of the said image layers usually consist of gelatin and/or other water-permeable film-forming agents which as such are well known in the art. The images may be obtained by exposing a silver halide emulsion layer and thereafter processing the exposed layers according to known methods.

I claim:

1. A photographic material comprising
   (a) a support carrying a photographic image that had been produced by exposing and processing a light-sensitive photographic emulsion layer, and,
   (b) superimposed upon at least one surface of the said photographic material, a transparent protective layer having a wavy uneven but smooth surface composed of a hydrophobic organic film-forming substance having heterogeneously dispersed therethrough transparent gel-like particles of another film-forming substance, which film-forming substances differ from each other in their chemical compositions and solubilities in organic solvents, and the gel-like particles of which have diameters between about 4 and about 40 microns.

2. A photographic material as defined in claim 1, in which the film-forming substance is selected from the group consisting of organic-solvent-soluble film-forming cellulose esters, cellulose ethers, linear polyesters, polyamides, polymers of ethylenically unsaturated monomers, alkyd resins having condensed therein alcohols with at least 3 hydroxyl groups, and melamine-formaldehyde resins.

3. A photographic material as defined in claim 2, in which the film-forming substance is a combination of a cellulose ester and of a copolymer of major proportions of vinyl chloride and minor proportions of further ethylenically unsaturated monomers.

References Cited in the file of this patent

UNITED STATES PATENTS

| | | |
|---|---|---|
| 1,411,677 | Trivelli | Apr. 4, 1922 |
| 2,043,906 | Sheppard et al. | June 9, 1936 |
| 2,331,746 | Talbot | Oct. 12, 1943 |
| 2,889,645 | Thieme | June 9, 1959 |

FOREIGN PATENTS

| | | |
|---|---|---|
| 212,225 | Great Britain | Feb. 12, 1925 |